United States Patent [19]

Gagliani et al.

[11] 4,360,604

[45] Nov. 23, 1982

[54] POLYIMIDE FOAMS

[75] Inventors: John Gagliani, Schaumburg; Raymond Lee; Usman A. K. Sorathia, both of Elk Grove Village, all of Ill.

[73] Assignee: International Harvester Co., Chicago, Ill.

[21] Appl. No.: 327,929

[22] Filed: Dec. 7, 1981

Related U.S. Application Data

[62] Division of Ser. No. 252,902, Apr. 10, 1981, Pat. No. 4,332,656.

[51] Int. Cl.$^3$ .............................................. C08G 69/32
[52] U.S. Cl. ................................ 521/189; 204/159.11; 521/184; 521/185; 523/137; 524/424; 528/188; 528/226; 528/229
[58] Field of Search ....................... 521/189, 184, 185; 523/137; 524/424; 528/226, 229, 188; 204/159.11

[56] References Cited

U.S. PATENT DOCUMENTS

| | | | |
|---|---|---|---|
| Re. 30,213 | 2/1980 | Gagliani et al. | 521/185 |
| 3,726,834 | 4/1973 | Acle, Jr. | 260/37 M |
| 4,070,312 | 1/1978 | Gagliani et al. | 260/65 |
| 4,241,193 | 12/1980 | Gagliani | 521/71 |
| 4,299,787 | 10/1981 | Gagliani | 264/41 |

*Primary Examiner*—Morton Foelak
*Attorney, Agent, or Firm*—LeBlanc, Nolan, Shur & Nies

[57] ABSTRACT

Copolyimide foams derived from a diester of 3,3',4,4'-benzophenonetetracarboxylic acid, an aromatic diamine, and a heterocyclic diamine. A molar concentration of the heterocyclic diamine approaching but not exceeding 0.42 is employed. This results in a flexible foam with a homogeneous cellular structure and a reduced compression set loss.

10 Claims, No Drawings

POLYIMIDE FOAMS

The invention described herein was made in the performance of work under NASA Contract No. NAS9-15484 and is subject to the provisions of Section 305 of the National Aeronautics and Space Act of 1958 (72 Stat. 435; 42 USC 2457).

This application is a division of application Ser. No. 252,902 filed Apr. 10, 1981, now U.S. Pat. No. 4,332,656.

In one aspect the present invention relates to novel, improved, polyimide foams which are flexible and have a homogeneous cellular structure and a reduced compression set loss.

The present invention also relates to precursors of foams with the characteristics identified in the preceding paragraph, to methods for making such precursors, and to methods for converting the precursors to the foams.

U.S. Pat. No. Re. 30,213 issued Feb. 12, 1980, to John Gagliani et al. for METHOD OF MAKING FOAMED COPOLYIMIDES AND PRODUCTS OBTAINED THEREFROM and U.S. patent application Ser. No. 935,378 filed Aug. 21, 1978, by John Gagliani for POLYIMIDES (now U.S. Pat. No. 4,241,193 issued Dec. 23, 1980) disclose hydrolytically stable copolyimide foams which are fire resistant and give off essentially no smoke or toxic fumes when they are heated to degradation temperature. Consequently, those foams are useful in aircraft cabins, space vehicles, and land and sea transport and in a variety of other applications where human life or equipment might be endangered by the overheating of conventional, more flammable, smoke-emitting materials.

The polyimide foams described in the foregoing patent and patent application are derived from precursors which contain an alkyl diester of 3,3',4,4'-benzophenonetetracarboxylic acid, an aromatic diamine, and a heterocyclic diamine.

The general model for the chemical reactions which are effected in converting the precursor to a polyimide of the character discussed above are shown below. The actual reactions are typically much more complex depending upon the number of diamines in the precursor:

(I) Esterification:

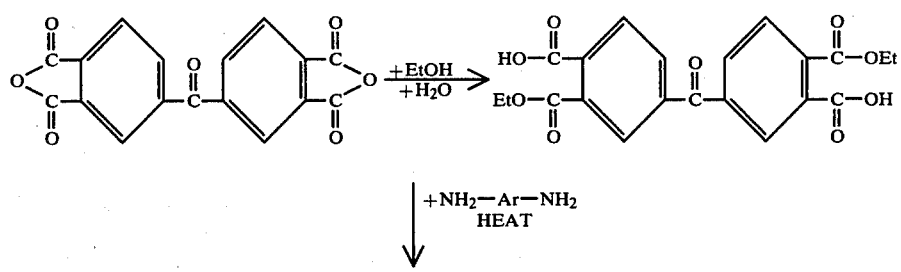

$+NH_2-Ar-NH_2$
HEAT (II) Amidization:

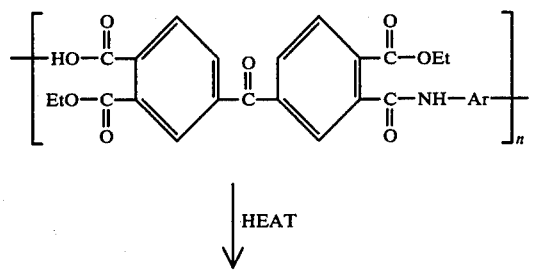

HEAT (III) Imidization:

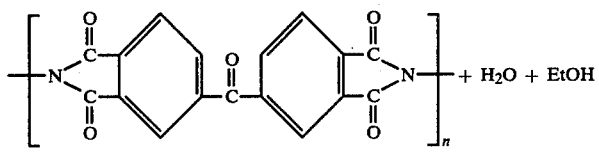

We have now discovered that the compression set properties of such foams can be improved if the molar ratio of heterocyclic diamine to tetracarboxylic acid diester(s) in the precursor is maintained in the range of about 0.4–0.42:1.0.

Compression set is a measure of the extent to which a foam will take on a permanent set or deformation after having been compressed to a stated fraction of its original thickness for a prolonged period of time. This is important in seating applications, for example; materials which are susceptible to compression set reach the point where tactile comfort becomes unacceptable much sooner than those having good compression set properties.

Generally speaking, then, our novel polyimide foams disclosed herein are prepared from precursors which are solutions of a lower alkyl ester of 3,3',4,4'-benzophenonetetracarboxylic acid or a mixture of such esters, and aromatic diamine which is free of aliphatic moieties, and a heterocyclic diamine. The imide-forming functionalities (the amino and carboxylic moieties) are preferably present in substantially equimolar amounts.

Exemplary of the aromatic and heterocyclic diamines that can be employed are:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene The precursors of our polyimide foams are essentially monomeric, solid state solutions of the selected ester (or esters) and diamines.

They are prepared by first reacting 3,3',4,4'-benzophenonetetracarboxylic acid or, preferably, a dianhydride of that acid with an esterification agent to form an alkyl diester. Exemplary esterification agents are methyl, ethyl, propyl, and isopropyl alcohols. Methanol is in many cases preferred because of its widespread availability, low cost, and other attributes; because its use facilitates conversion of the precursor to a polyimide foam; and because the foams made from the methyl esters tend to be more flexible, resilient, and compression set resistant. Ethanol is also a preferred esterification agent.

The esterification reaction is followed by the addition of the diamines, which are dissolved in the reaction mixture. The temperature is kept below the reflux temperature of the esterification agent during dissolution of the diamines and low enough to avoid polymerization of the diamines and ester(s).

A surfactant can be added to the mixture thus formed to increase the fatigue resistance by increasing the bubble stability of the foam and the uniformity of the cellular structure. One preferred surfactant is Zonyl FSB, a nonionic, fluorinated, polyalkylene copolymer manufactured by E.I. DuPont de Nemours and Company. We have employed from 0.00625 to 0.05 percent of this surfactant based on the weight of the ester and diamine constituents. In systems containing 2,6-diamino pyridine and p,p-methylene dianiline along with a 3,3',4,4'-benzophenonetetracarboxylic acid methyl or ethyl ester, a concentration of ca. 0.0125 percent proved to be optimum.

The material existing after dissolution of the diamines and the addition of any additives is transformed into an amorphous powder capable of being converted into a flexible, resilient, polyimide foam. Although not essential, it is preferred that spray drying be employed for this purpose because the liquid resin can thereby be economically transformed on a continuous basis and in one step into a dry powder. Also, spray drying allows for modification of the precursor in ways which can be used to vary the properties of the final product.

One suitable, state-of-the-art, spray drying process is described in copending application Ser. No. 186,670 filed Sept. 12, 1980 (now U.S. Pat. No. 4,296,208 issued Oct. 20, 1981), which is hereby incorporated herein by reference. In that process the material existing after the dissolution of the diamines and the addition of any additives is diluted with about 20 parts of an alkyl alcohol per 100 parts of resin and atomized, preferably with a rotary atomizer operated at a speed in the range of 32,000 to 35,000 rpm. The atomized droplets are dried in a chamber having an inlet and an outlet for a heated gas. The inlet temperature of the gas is maintained in the range of 100°–110° C., and the outlet temperature of the gas is limited to a maximum of 80° C.

The amphorous, powdered, resinoid precursor existing at the end of the spray drying step can be converted to a monolithic, polyimide foam of the character discussed above by various techniques including dielectric, thermal, and microwave heating. The latter, alone or with a thermal post-cure, is preferred because of the speed with which the foam can be generated and cured; because the foam is homogeneously heated; and because handling of the fragile, uncured foam can be avoided.

Microwave techniques and equipment that can be used to foam and cure the precursor are disclosed in copending application Ser. No. 186,629 filed Sept. 12, 1980 (now U.S. Pat. No. 4,305,796 issued Dec. 15, 1981), which is also intended to be incorporated herein by reference. They can be used to convert the precursor to a foam by the free rise technique; by an open mold, constrained rise technique in which spacers are employed to limit the rise of the foam; or in a closed mold.

Foaming-curing parameters that have proven satisfactory in converting representative precursors of the character described herein to flexible, resilient foams are two to 55 minutes exposure to high frequency radiation in an oven operating at a frequency of 915 to 2450 mHz and at 3.75 to 15 kW power and a power output to precursor unit weight ratio of 0.6 to 1 kW/kg.

The thermal postcure of the polyimide, if employed, is accomplished by heating the product of the microwave heating step in a circulating air oven at a temperature of 500° to 550° F. for 30 to 200 minutes to complete the curing of the polyimide.

Preferably, the dry precursor is preheated before it is exposed to microwave radiation. This contributes to higher foam rise, a more homogeneous cellular structure, and a reduced scrap rate. Preheat temperatures of 121.1° to 148.9° C. (250° to 300° F.) for 2–6 minutes have been successfully employed.

Steady application of the microwave energy is not required, and pulsed or cyclic exposure of the precursor to the microwave energy may even produce superior results. Typically, the duration of the microwave energy pulses and the intervals therebetween will be on the order of 60 and 20 seconds, respectively.

Also, conductive fillers can often advantageously be incorporated in the precursor to promote its conversion to a polyimide by generating additional thermal energy. From 5 to 20 weight percent of activated carbon or graphite can be employed for that purpose.

Another technique that can be used to advantage in making polyimide foams by the practice of the present invention is thermal heating of the microwave cavity. Temperatures in the range of 121.1° to 232.2° C. (250° to 450° F.) are employed.

Similarly, an optimum product can in many, if not most, cases be obtained by heating the substrate or mold on or in which the precursor is foamed to a temperature of 121.1° to 148.9° C. (250° to 300° F.) before the precursor is exposed to microwave energy.

Also, quality may in many cases be optimized by employing different microwave energy power levels to foam the precursor and to subsequently cure the foam. For example in making foams from precursors of the character described above in existing equipment, a power level of 10 kW for foaming followed by one of 15 kW to complete the cure of the polyimide has been selected as optimum.

The depth and loading of the particular precursor on the substrate are important to the development of a stable, homogeneous structure in the foam to which the precursor is converted. The powder should be at least 0.5 cm deep. Powder loadings as low as 1.6 kg/m² have been successfully employed. However, loadings in the range of 4.3 to 15 kg/m² are preferred; and a loading of ca. 7.7 kg/m² is thought to be optimum.

Also, it has been found with free rise foaming techniques that optimum yields are obtained from square shaped beds rather than those of rectangular configuration.

From the foregoing it will be apparent to the reader that the primary object of our invention resides in the provision of novel, improved, polyimide foams.

A related, and also important, but more specific object of our invention resides in the provision of polyimide foams with improved compression set properties.

Still another important, related objects of our invention reside in the provision of precursors for the novel polyimide foams described in the preceding objects and in the provision of methods for preparing those precursors and for converting them to polyimides.

Certain important objects of the present invention have been identified above. Other important objects and advantages and additional novel features of the invention will be apparent to those skilled in the relevant arts from the foregoing general description of that invention; from the appended claims; and from the ensuing, detailed discussion and description of the invention.

In one exemplary study demonstrating the advantages of our invention, 3,3',4,4'-benzophenonetetracarboxylic acid dianhydride (BTDA) (322.23 g, 1.0 mole) was added to 240 ml of methyl alcohol and 24 ml of water in a one-liter, three-neck flask equipped with a thermometer, a mechanical stirrer, and a reflux condenser. After addition, the mixture was refluxed until clear. The mixture was then refluxed for an additional 60 minutes to ensure complete reaction of the BTDA to its half (or di-) ester.

The contents of the flask were then cooled to 40°–50° C. (104°–122° F.).

2,6-Diaminopyridine (2,6 DAP) (43.7 g, 0.4 mole) and p,p'-methylene dianiline (MDA) (119.0 g, 0.6 mole) were added to the half ester solution, and the resulting mixture was heated to 60°–65° C. (140°–149° F.) with agitation for five minutes.

At this stage the resulting liquid precursor was diluted with methyl alcohol in a ratio of 20 parts of alcohol per 100 parts of resin.

FSB surfactant was also mixed with the liquid resin at this stage in varying concentrations. Thereafter, a Niro Mobile spray dryer was heated to an inlet temperature of 100° C. (212° F.) and an outlet temperature of 70° C. (158° F.) as discussed in copending application Ser. No. 186,670. The liquid resin was then fed into the dryer with the feed being manually adjusted throughout the operation to keep the dryer outlet temperature in the range of 69°–71° C. (156°–160° F.).

In each instance this produced a powder which was collected, sieved through a Tyler 48 mesh (297 microns) sieve, and rolled for 30 minutes in a round plastic bottle.

Each powder this produced was, essentially, a particulate, solid state solution of unreacted diamines, 3,3',4,4'-benzophenonetetracarboxylic acid diester, and FSB surfactant.

A foam was produced from each of the powdered precursors using a Gerling Moore Batch Cavity Model 4115 microwave oven operating at a frequency of 2450 mHz and a power of 5 kW.

The precursor was spread on a Teflon coated glass cloth substrate and placed in the microwave cavity at room temperature. After two to twelve minutes of exposure to the microwave field, depending upon the particular test being conducted, the powder expanded into a homogeneous, cellular foam block. This block was thermally cured into a flexible and resilient foam by heating it at 260° C. (500° F.) for two hours.

The compression set (and other) properties of the foams were then identified and compared to the corresponding properties of foams prepared in the manner described above from precursors containing higher and lower concentrations of 2,6-diaminopyridine.

Compression set of the foam was determined at 90 percent compression according to ASTM Standard D-1564, Method B, using two steel plates held parallel to each other by clamps. The space between the plates was adjusted to the required thickness by spacers.

The results from the first stage of this study, which involved the use of 0.05 percent FSB surfactant in each precursor, are tabulated below in Table 1.

TABLE 1

| Copolyimide System | Composition | Mole Ratio | Density kg/m³ | Density lbs/ft³ | Resiliency | % Loss After 30 Minutes Recovery | Type of Foam |
|---|---|---|---|---|---|---|---|
| 1 | BTDA:2,6DAP:MDA | 1:0.4:0.6 | 14.7 | 0.92 | 85 | 21.0 | Flexible, resilient, fine cellular structure |
| 2 | BTDA:2,6DAP:MDA | 1:0.3:0.7 | 8.2 | 0.51 | 70 | 28.5 | Flexible, resilient, fine cellular structure |
| 3 | BTDA:2,6DAP:MDA | 1:0.2:0.8 | 6.7 | 0.42 | 60 | 41.3 | Flexible, resilient, fine cellular structure |
| 4 | BTDA:2,6DAP:MDA | 1:0.1:0.9 | 8.5 | 0.53 | 50 | 33.7 | Flexible, resilient, fine cellular structure |

BTDA = 3,3',4,4'-benzophenonetetracarboxylic acid, methyl diester
2,6DAP = 2,6'-diaminopyridine
MDA = p,p'-metaphenylene diamine The data show that the copolyimide with the concentration of heterocyclic diamine in the range critical to the success of our invention (system No. 1) had much better compression set properties than the other systems with which it is compared in Table 1.

The study was extended by decreasing the concentration of FSB surfactant in subsequently prepared precursors to 0.0125 percent and by increasing the molar concentration of 2,6-diaminopyridine. The results this produced are shown below in Table 2.

TABLE 2

| Copolyimide System Number | Composition | Molar Ratio | Concentration of Surfactant (%) | % Loss After 30 Minutes Recovery | Type of Foam |
|---|---|---|---|---|---|
| 2 | BTDA:2,6DAP:MDA | 1:0.3:0.7 | 0.0125 | 40.0 | Fine, homogeneous cellular structure |
| 1 | BTDA:2,6DAP:MDA | 1:0.4:0.6 | 0.0125 | 19.6 | Medium-large homogeneous cellular structure |
| 3 | BTDA:2,6DAP:MDA | 1:0.42:0.58 | 0.0125 | 12.1 | Reticulated foam with medium size cellular structure |
| 4 | BTDA:2,6DAP:MDA | 1:0.44:0.56 | 0.0125 | — | Highly reticulated foam with large and weak cellular structure |
| 5 | BTDA:2,6DAP:MDA | 1:0.5:0.5 | 0.0125 | — | Highly reticulated foam with chopped strands like cell structure. Poor - hollow foam |

The tabulated data again show that the foams made from precursors with concentrations of heterocyclic diamines in the critical range had much better compression set properties than those foams made from the precursor with a lower concentration of the heterocyclic diamine.

At concentrations above the critical level, cell walls disappeared to an increasing extent, being replaced by lamellar strands. This effect was most pronounced at the highest, 0.5 molar concentration of 2,6-diaminopyridine. In that case the product was an unusable hollow shell with a thick, integral skin.

It was also found in the course of the study that the high degree of reticulation at a heterocyclic diamine molar concentration of 0.44 is undesirable because it adversely effects fatigue resistance by causing failure through a combination of cell fracture and shredding.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and equivalency of the claims are therefore intended to be embraced therein.

What is claimed and desired to be secured by United States Letters Patent is:

1. That method of preparing a polyimide foam precursor which comprises the steps of: dissolving 3,3',4,4'-benzophenonetetracarboxylic acid or an anhydride of that acid in one or more alkyl alcohols to form one or more alkyl diesters of the acid; dissolving a heterocyclic diamine and a meta- or para-substituted diamine in said alcohol(s) in amounts such that the imide forming functionalities of the diester(s) and the diamines are substantially equimolar and the molar ratio of heterocyclic diamine to tetracarboxylic acid ester(s) is in the ratio of about 0.4–0.42 to 1.0; and thereafter evaporating excess alcohol(s) from, and reducing the mixture of ester(s) and diamines to, a dry particulate form.

2. A method of preparing a polyimide foam precursor as defined in claim 1 which includes the step of mixing from about 0.00625 to about 0.05 weight percent of an effective surfactant with the mixture of tetracarboxylic acid ester(s) and diamines prior to evaporating the excess alcohol(s) therefrom.

3. A method of preparing a polyimide foam precursor as defined in claim 1 wherein the diamines that are mixed with the tetracarboxylic acid ester(s) are 2,6-diaminopyridine and p,p'-methylene dianiline.

4. A method of preparing a polyimide foam precursor as defined in claim 1 wherein excess alcohol(s) are removed from the mixture of tetracarboxylic acid diester(s) and diamines and that mixture concurrently converted to the dry particulate form by spray drying said mixture.

5. A method of preparing a polyimide foam precursor as defined in claim 4 wherein the mixture of tetracarboxylic acid diester(s) and diamines is diluted with an alkyl alcohol in a ratio of about 20 parts of alcohol to 100 parts of said mixture before the mixture is spray dried.

6. A method of preparing a polyimide foam precursor as defined in claim 4 wherein the mixture of tetracarboxylic acid diester(s) and diamines is spray dried by: atomizing said mixture, introducing the atomized mixture into a chamber having an inlet and an outlet, and so circulating a heated gas through said chamber that the gas inlet temperature is in the range of 100°–110° C. and the gas outlet temperature is a maximum of 80° C.

7. A method of preparing a polyimide foam precursor as defined in claim 6 wherein the mixture of tetracarboxylic acid diester(s) and diamines is atomized with a rotary atomizer operated at a speed in the range of 32,000 to 35,000 rpm.

8. A method of preparing a polyimide foam precursor as defined in claim 1 wherein the diamines are selected from the following group:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene.

9. A method of preparing a polyimide foam precursor as defined in claim 1 wherein from 5 to 20 weight percent of a conductive filler is incorporated into said mixture of ester(s) and diamines to promote the conversion of the precursor to a polyimide by microwave energy.

10. A method of preparing a polyimide precursor as defined in claim 9 wherein the conductive filler is an activated carbon or graphite.

* * * * *